UNITED STATES PATENT OFFICE.

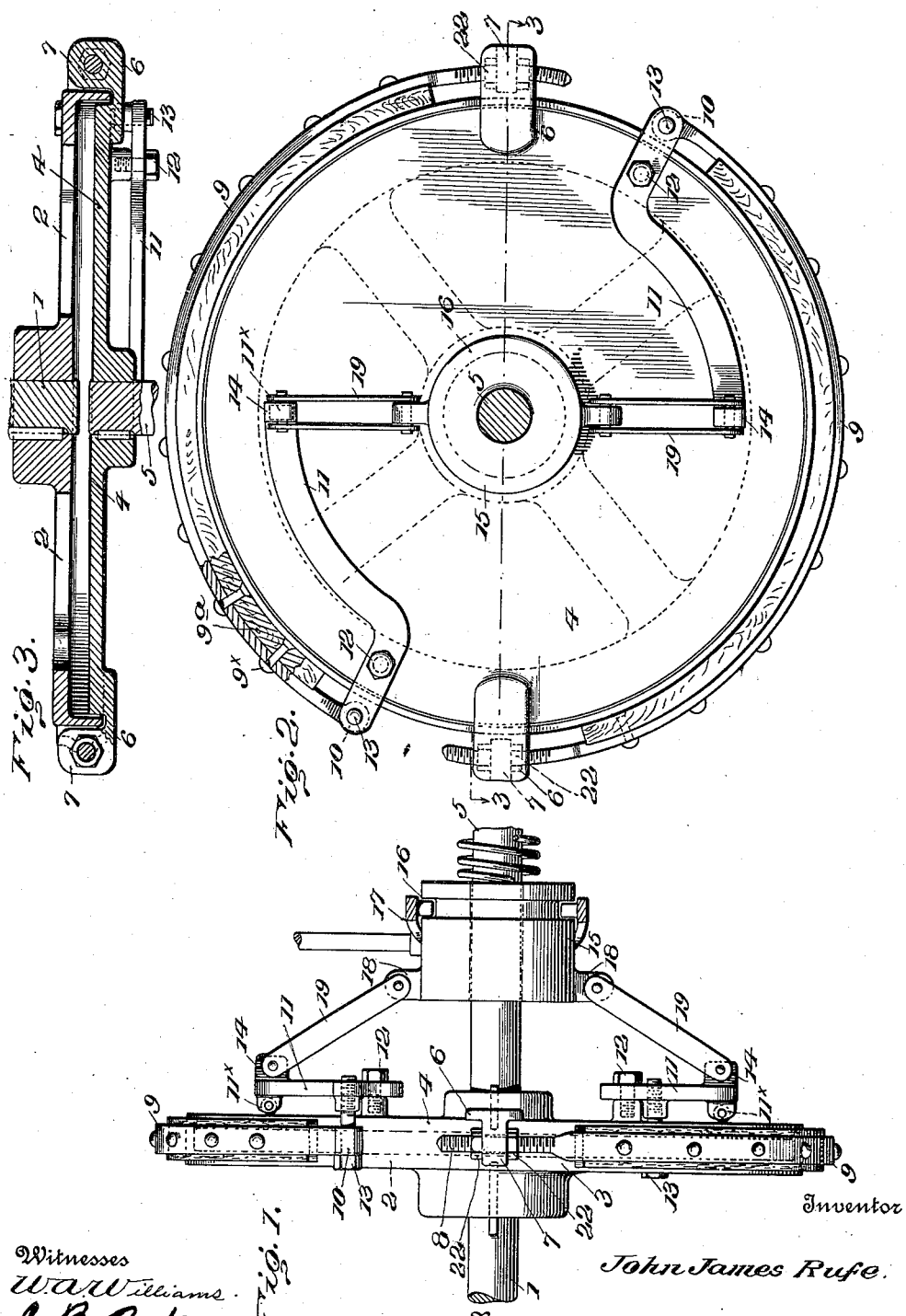

JOHN JAMES RUFE, OF DOYLESTOWN, PENNSYLVANIA.

CLUTCH.

1,034,514.  Specification of Letters Patent.  Patented Aug. 6, 1912.

Application filed September 6, 1911. Serial No. 647,803.

*To all whom it may concern:*

Be it known that I, JOHN JAMES RUFE, citizen of the United States, residing at 123 East Ashland street, Doylestown, in the county of Bucks and State of Pennsylvania, have invented certain new and useful Improvements in Clutches, of which the following is a specification.

This invention relates to improvements in clutches.

The object of the invention is to provide means for effectually forming a gripping action between the driven and the driving shaft.

A further object of the invention is to provide means between the driven and driving shafts whereby by slight movement of the operating lever a positive clutching action will occur.

The invention also comprehends improvements in the details of construction and arrangement of parts which will be hereinafter described and particularly pointed out in the claims.

In the drawings: Figure 1 is a side elevation of my improved clutch. Fig. 2 is an end view partly in section. Fig. 3 is a transverse sectional view on line 3—3, of Fig. 2.

1 indicates a driving shaft keyed to a disk 2, formed with an annular flange 3, and the usual spokes. Fitting snugly against the disk 2 and housed within the annular flange 3, is a flat disk 4 keyed on a driven shaft 5. Extending from two diametrical points and projecting from the periphery of the flat disk 4, are lugs 6, each provided with an overhanging perforated ear 7. Extending through the perforation of each ear is the threaded end 8 of a segmental gripping member 9 the opposite end of which is formed with an opening 10. The gripping members 9, are provided on their inner surfaces with wooden linings, indicated at $9^a$, and secured in position by a series of rivets $9^x$. Arranged diametrically on the flat disk 4, and spaced from the lugs 7, are two substantially L shape levers 11—11, pivoted to the flat disk 4 by bolts 12—12. The outer end of each L shape lever is formed with an opening, through which and the opening 10, passes a bolt 13, forming a pivotal connection with the gripping member 9. The inner ends of the L shape levers 11—11, are formed with outwardly extending perforated lugs 14. The two lugs are in alinement with each other for a purpose to be described. On the rear of the inner ends of the L shape levers are anti-friction rollers $11^x$, which bear on the disk 4, to relieve the friction when the clutch is operated. The rollers also serve as a support for the levers when pressure is applied in coupling the clutch members.

Slidably mounted on the driven shaft 5, is a collar 15, formed with an annular groove 16, for a shipper lever 17. Extending from opposite sides of the collar 15, are perforated ears 18, the ears being pivotally connected with the lugs 14, by pairs of links 19. The purpose of making the lugs 14, in alinement is to afford a connection with opposite sides of the collar 15 which will exert an outward pressure in a direct plane with the center of the driven shaft, when operating the clutch.

In operation, the shipper lever 17, is operated to slide the collar 15, toward the disk 4, and as the links 19, are disposed at an angle they will be straightened and thereby rock the L shaped levers on their pivots 12—12, hence exert a pull on the gripping members 9—9, and cause the wood linings thereof to engage and tightly grip the periphery of the overhanging flange 3. This operation effectually binds the two disks together, and imparts motion from the driving to the driven shaft. When pressure on the shipper lever 17 is released, the parts will be returned to normal position by said lever. Immediately the collar is slid away from the disk 4, the links assume an inclined position hence draw the inner ends of the L shape links toward each other and release the grip of the two gripping members from the flange 3, and thereby free the driven shaft from the driving shaft.

To take up wear of the gripping members adjusting nuts 22, engage the threaded ends 8, of said members and bind the latter securely to the overhanging lugs 7—7. Obviously by adjusting these nuts the gripping members may be adjusted to snugly engage the disk 2.

The improvement is simple in construction, and as the various parts are positively connected, and the pivotal points are arranged to obtain the greatest possible leverage, little effort is required to operate the clutch.

Having thus described my invention, what I claim is:—

1. In a clutch, the combination of a driving shaft, a disk secured thereto, a driven shaft, a disk secured thereto, said disk having a flat surface, two oppositely disposed gripping elements adjustably secured to the disk on the driven shaft and engaging the periphery of the disk on the driving shaft, two substantially L-shape levers, pivots connecting the said levers near the outer edge of the flat surface of the disk on the driven shaft, pivots connecting the outer ends of the levers to the gripping members, the inner ends of the two substantially L-shape levers terminating at diametrically opposite points, the inner ends of each lever having a roller, rolling on the flat surface of the disk when the levers are turned on their pivots, said rollers also receiving the inner thrust when the clutch is thrown into operation, a sliding collar mounted on the driven shaft and free to have a slight rotative movement thereon to compensate for the rocking movement of the L-shape levers, whereby to maintain the diametric relation of the ends of said levers, links connecting the inner ends of the two substantially L-shape levers and the sliding collar, and a spring back of said collar to normally cause the disks to engage.

2. In a clutch, the combination of two clutching members, one of which is provided with a flat surface, gripping members, pivoted levers for operating the gripping members, an anti-friction roll between the pivoted levers and the clutching member having the flat surface, and means including a sliding rotative collar for operating the levers, the anti-friction rolls relieving friction when the levers rock on their pivots and adapted to receive the end thrust of the collar when the latter is slid toward the clutch, said collar rotating when the levers are rocked.

3. In a clutch, the combination of a shaft, two clutching members mounted on the shafts, gripping members, levers for operating the gripping members, pivots for securing the gripping members to one of the clutching members, links pivoted to the gripping members, the pivots connecting the links to the gripping members being disposed at right angles to the pivots securing the levers to the clutching member, a collar rotatively and slidingly mounted on the shaft on which the clutching member carrying the levers is mounted, and pivotal connections between the collar and the links, the collar being rotative on the shaft to prevent binding of the links and the levers when the collar is slid on the shaft.

In testimony whereof I affix my signature in presence of two witnesses.

JOHN JAMES RUFE.

Witnesses:
  Isaac J. Vanartsdalen,
  Calvin S. Boyer.